(12) United States Patent
Pucher et al.

(10) Patent No.: US 8,978,441 B2
(45) Date of Patent: Mar. 17, 2015

(54) POSITION MEASURING SYSTEM AND METHOD FOR ASSEMBLY

(75) Inventors: Wolfgang Pucher, Traunstein (DE); Markus Kühler, Nuβdorf/Sondermoning (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 904 days.

(21) Appl. No.: 13/135,223

(22) Filed: Jun. 29, 2011

(65) Prior Publication Data

US 2012/0000269 A1    Jan. 5, 2012

(30) Foreign Application Priority Data

Jul. 5, 2010   (DE) .......................... 10 2010 030 948

(51) Int. Cl.
  *G01B 3/30*   (2006.01)
  *G01D 5/244*   (2006.01)
  *G01D 5/347*   (2006.01)
(52) U.S. Cl.
  CPC ........ *G01D 5/24423* (2013.01); *G01D 5/34707* (2013.01); *G01D 5/3473* (2013.01)
  USPC ....................................................... 73/1.79
(58) Field of Classification Search
  CPC ... G01B 21/042; G01B 21/045; B25J 9/1692; G01C 25/00; G01P 21/00
  USPC ........................................................ 73/1.79
  See application file for complete search history.

(56) References Cited

U.S. PATENT DOCUMENTS

| | | |
|---|---|---|
| 6,904,695 B2 | 6/2005 | Freitag et al. |
| 2004/0045182 A1 | 3/2004 | Freitag et al. |
| 2010/0238435 A1* | 9/2010 | Spalding .................... 356/243.1 |

FOREIGN PATENT DOCUMENTS

WO    WO 02/40947 A1    5/2002

* cited by examiner

*Primary Examiner* — Hezron E Williams
*Assistant Examiner* — Rodney T Frank
(74) *Attorney, Agent, or Firm* — Brinks Gilson & Lione

(57) ABSTRACT

A method for mounting a substrate of a measurement graduation and a scanning head of a position measuring system on a first machine part and a second machine part. The method including fastening a substrate of a measurement graduation and a scanning head on first and second portions, respectively, of a mounting aid. The method including adjusting a location of the first portion relative to the second portion in a first degree of freedom that differs from a measurement direction in which a relative position of the first machine part relative to the second machine part is to be measured. The method including fastening the substrate and the scanning head on the first and second machine parts, respectively, at the mounting position. The method further including removing the mounting aid.

6 Claims, 6 Drawing Sheets

POSITION MEASURING SYSTEM AND METHOD FOR ASSEMBLY

RELATED APPLICATIONS

Applicants claim, under 35 U.S.C. §119, the benefit of priority of the filing date of Jul. 5, 2010 of a German patent application, copy attached, Serial Number 10 2010 030 948.6, filed on the aforementioned date, the entire contents of which is incorporated herein by reference.

BACKGROUND

1. Technical Field

The present invention relates to a position measuring system.

2. Background Information

One such position measuring system is described in International Patent Disclosure WO 02/40947 A1. It has a measurement graduation substrate, which is scanned in contactless fashion by a scanning head for position measurement. For position measurement, it is necessary that the substrate of the measurement graduation be secured in a predetermined location relative to the scanning head on the machine parts that are to be measured. This purpose is served by a mounting aid, which fixes the substrate in a predetermined mounting position on the scanning head. In order to reach this mounting position, it is proposed according to WO 02/40947 A1 that the location of the scanning head relative to the substrate of the measurement graduation be calibrated in a separate operation, before the scanning head is positionally fixed on the substrate.

Increasingly, greater measurement precision is being demanded. This measurement precision is affected by the association of the scanning head and the measurement graduation. It has been demonstrated that by the known position measuring system, it is possible only with difficulty to achieve an association, required for the sake of precise position measurement, between the scanning head and the substrate of the measurement graduation. The two-stage procedure of calibration and positional fixation makes an exact association in the requisite mounting position possible but only inconveniently.

OBJECTS AND SUMMARY OF THE INVENTION

It is therefore an object of the present invention to create a position measuring system of the type defined at the outset with which precise position measurement is made possible.

This object is attained by a position measuring system for measuring a relative position of a first machine part relative to a second machine part in a measurement direction. The position measurement system includes a substrate of a measurement graduation, wherein the substrate is mountable on a first machine part and a scanning head for scanning the measurement graduation, wherein the scanning head is mountable on a second machine part that moves relative to the first machine part in a measurement direction. The position measurement system includes a mounting aid that secures the substrate in a mounting position on the scanning head so that the substrate and the scanning head can be manipulated as a common unit and are mountable in this relationship on the first machine part and the second machine part. The mounting aid includes a first portion for fixing on itself the substrate in the mounting position in a stationary fashion, and, after the mounting has been accomplished the fixation between the first portion and the substrate is detachable. The mounting aid includes a second portion for fixing on itself the scanning head in the mounting position in a stationary fashion, and, after the mounting has been accomplished, the fixation between the second portion and the scanning head is detachable. The mounting aid further includes a calibration device positioned between the first portion and the second portion, wherein the calibration device has a structure such that the mounting position of the mounting aid between the substrate and the scanning head is adjustable in a first degree of freedom, which differs from the measurement direction.

It is also an object of the present invention to disclose a method for mounting a position measuring system especially simply, in the requisite mounting position, on the machine parts that are to be measured, so as to obtain high measurement precision of the position measuring system.

This object is attained by a method for mounting a substrate of a measurement graduation and a scanning head of a position measuring system on a first machine part and a second machine part, wherein a relative position of the first machine part and the second machine part is to be measured in a measurement direction, in which upon the mounting, the substrate is associated with the scanning head in a mounting position. The method including fastening a substrate of a measurement graduation on a first portion of a mounting aid in a stationary manner and fastening a scanning head on a second portion of the mounting aid in a stationary manner. The method including establishing a mounting position of the substrate on the scanning head by adjusting a location of the first portion relative to the second portion in a first degree of freedom that differs from a measurement direction in which a relative position of the first machine part relative to the second machine part is to be measured, wherein the adjusting is accomplished by a calibration device integrated with the mounting aid. The method including fastening the substrate on the first machine part in a stationary manner at the mounting position and fastening the scanning head on the second machine part in a stationary manner at the mounting position. The method further including disconnecting fixation between the substrate and the first portion of the mounting aid and disconnecting fixation between the scanning head and the second portion of the mounting aid. The method also including removing the mounting aid.

Further advantageous characteristics and advantages of the present invention are illustrated in the ensuing description of exemplary embodiments in conjunction with the drawings.

Further advantages and details of the present invention will become apparent from the ensuing description of exemplary embodiments in conjunction with the accompanying drawings.

DETAILED DESCRIPTION OF THE PREFERRED EMBODIMENTS

A first exemplary embodiment of the present invention will be described in further detail in conjunction with FIGS. 1 through 5. The position measuring system, shown as an example, measures an angle between a measurement graduation 1 and a scanning head 2 that scans this measurement graduation 1 in a measurement direction W. For that purpose, the measurement graduation 1 is pivotable relative to the scanning head 2 about the rotary axis D in the measurement direction W.

Figure 4:
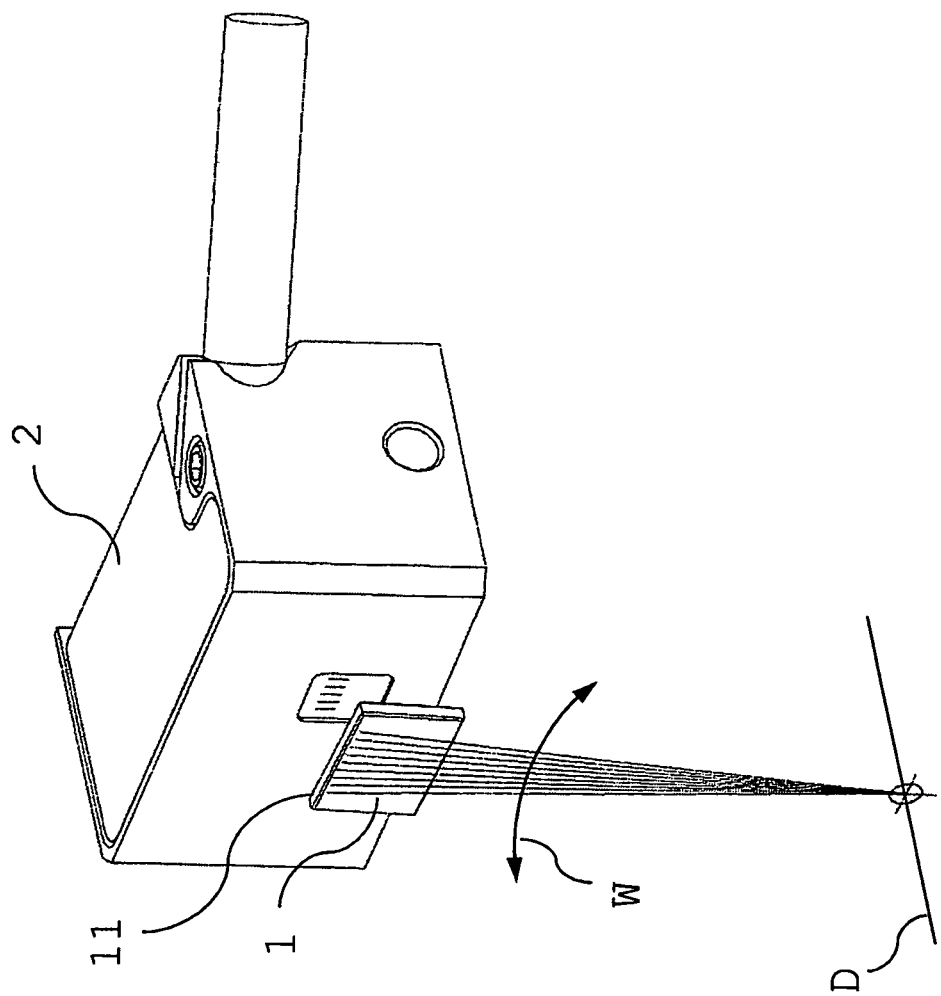
FIG. 4 shows a perspective view of an embodiment of the scanning head and the substrate of the measurement graduation used with the position measuring system of FIG. 1 in accordance with the present invention.

As shown in detail in FIG. 4, the measurement graduation 1, scanned by the scanning head 2 in the position measurement, is spaced apart radially from the rotary axis D and is embodied as a radial graduation, which includes a succession of graduation lines that can be optically scanned in contactless fashion by the scanning head 2. In the example shown, the measurement graduation 1 includes a succession of reflective and nonreflective graduation lines, and the scanning head, in a known manner, contains a light source and detectors. The light of the light source is modulated as a function of position by the measurement graduation 1 and, by reflection, reaches the detectors, which generate a plurality of position-dependent electrical scanning signals that are phase-offset from one another.

Figure 5:
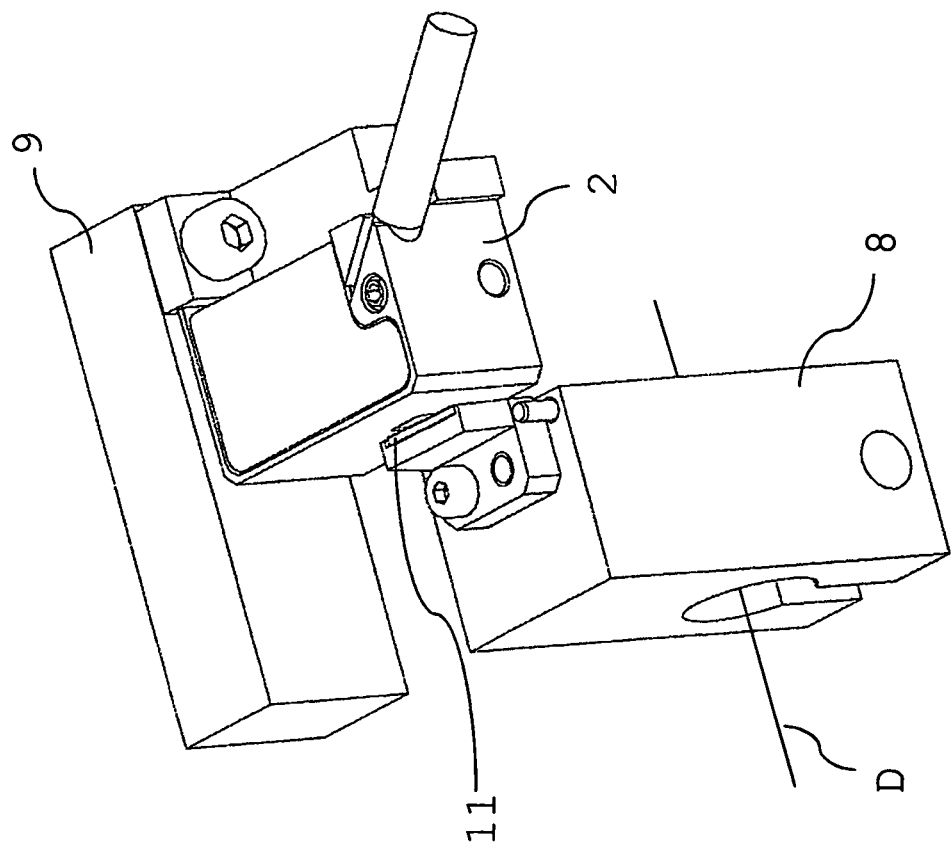
FIG. 5 shows a perspective view of the position measuring system of FIG. 1 in a mounted state in accordance with the present invention.

The position measuring system is a so-called modular system, in which the scanning head 2 is not guided in the measurement direction W by a substrate 11 of the measurement graduation 1. Instead, as shown in FIG. 5, the guidance is implemented only in the mounted state by the machine parts 8 and 9 that are to be measured. For the sake of simplifying the attachment to the machine parts 8 and 9 that are to be measured, the substrate 11 of the measurement graduation 1 is associated fixedly in positionally fixed fashion with the scanning head 2 in a mounting position, specifically in such a way that the substrate 11 of the measurement graduation 1 and the scanning head 2 can be manipulated as a common unit.

This association is effected by a mounting aid 3, with which the substrate 11 of the measurement graduation 1 is secured to the scanning head 2. This fastening is embodied such that during the mounting on the machine parts 8 and 9 to be measured, the substrate 11 is associated in stationary fashion with the scanning head 2, but once mounting has been effected the mounting aid 3 is detachable from both the substrate 11 and the scanning head 2, so that the mounting aid 3 can be removed. In the actual position measurement, the mounting aid 3 is detached from the substrate 11 and the scanning head 2 and removed, as shown in FIG. 5.

The mounting aid 3 has a first portion 31, which is fixed in stationary fashion for the mounting and once mounting has been done is fixed detachably on the substrate 11 of the measurement graduation 1. The fixation is done by a screw 32.

The mounting aid 3 furthermore has a second portion 33, which for mounting is fixed in stationary fashion and once mounting has been done is fixed detachably on the scanning head 2. This fixation as well is effected by a screw 34.

The mounting aid 3 furthermore has at least one calibration device 4, 5 between the first portion 31 and the second portion 33, which calibration device is embodied such that the mounting position between the substrate 11 of the measurement graduation 1 and the scanning head 2 is adjustable in at least one degree of freedom, and this adjustable degree of freedom differs from the measurement direction W. By calibration of the relative location of the measurement graduation 1 with respect to the scanning head 2, it is thus possible to optimize the association of the two parts 1, 2, so that the scanning signals have optimal parameters, such as amplitude and/or phase relationship. For that purpose, the mounting aid 3 is preferably embodied such that during the calibration, the measurement graduation 1 can be scanned by the scanning head 2, so that the association can be calibrated based on the actual generated scanning signals.

It is advantageous if the at least one calibration device 4, 5 makes a linear adjusting motion possible, in particular in the radial direction X and/or in a direction Y that extends at a tangent to the circumferential direction of the measurement graduation 1, or in other words at a tangent to the measurement direction W.

If a calibration in a plurality of degrees of freedom X, Y is necessary, then a plurality of calibration devices 4, 5 are disposed between the first portion 31 and the second portion 33. With these calibration devices 4, 5, the mounting position between the measurement graduation 1 relative to the scanning head 2 is adjustable in a plurality of degrees of freedom X, Y independently of one another. For that purpose, the plurality of calibration devices 4, 5 are disposed in series, one after the other.

The serial disposition of two calibration devices 4, 5 is achieved in the example shown by providing a base body 6 as an intermediate element, relative to which the first portion 31, on the one hand, is adjustable in one degree of freedom Y and, on the other, the second portion 33 is adjustable in a further degree of freedom X. Accordingly, beginning with the substrate 11 of the measurement graduation 1, the first portion 31 of the mounting aid 3 is disposed in stationary fashion on the substrate 11, and the calibration device 5 is disposed on the first portion 31. Furthermore, the base body 6 is disposed in turn on the calibration device 5. Furthermore, the calibration device 4 is disposed in turn on the base body 6 and the second portion 33 is disposed on the calibration device 4. Furthermore, the scanning head 2 is fastened with this second portion 33. By this serial disposition, the mutually independent calibration capability in the aforementioned degrees of freedom X and Y results, and as a result an optimal association of the measurement graduation 1 with the scanning head 2 is possible, in which even in the later measurement mode, the scanning signals have the desired parameters.

Once the measurement graduation 1, on the basis of the scanning signals, is optimally aligned relative to the scanning head 2 by the calibration devices 4 and 5 of the mounting aid 3, the attachment of the substrate 11 of the measurement graduation 1 to the machine part 8 and of the scanning head 2 to the machine part 9 is effected. As a result of this attachment, the optimally established association between the measurement graduation 1 and the scanning head 2 is applied to the machine parts 8, 9, so that during the ensuing measurement mode, highly accurate and precise position measurement can take place. Only once the attachment of the substrate 11 and the scanning head 2 to the machine parts 8 and 9, respectively, has been done is the mounting aid 3 detached from the substrate 11 of the measurement graduation 1 and from the scanning head 2, and the mounting aid 3 is removed. The removal of the mounting aid 3, with which the calibration devices 4 and 5 are integrated, has the major advantage that the ensuing measurement mode is unimpeded. In the measurement mode, no unnecessary parts are present on the machine parts 8 and 9 that are moved relative to one another, and so the dynamic properties are unimpeded, and high measurement accuracy is made possible.

Figure 1:
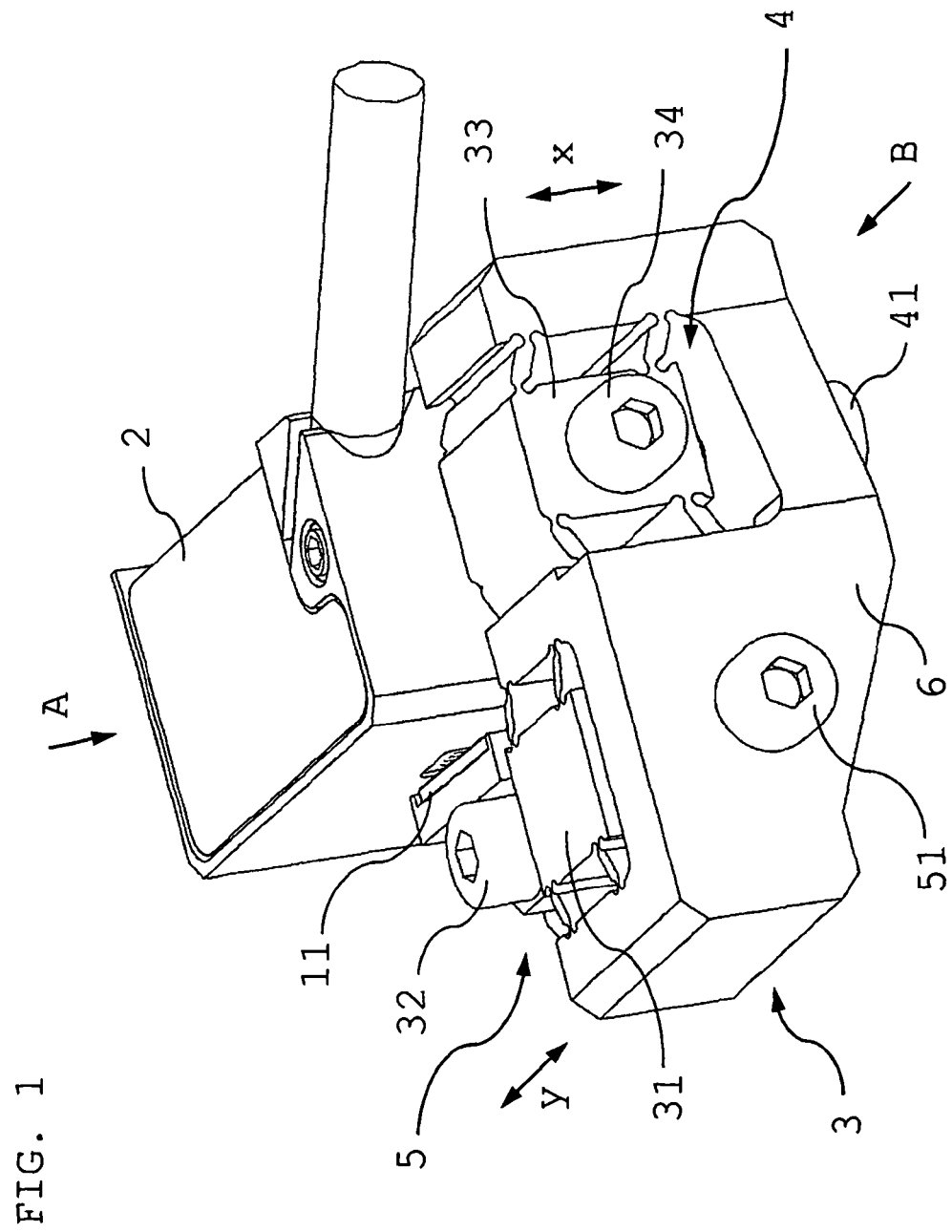
FIG. 1 shows a perspective view of an embodiment of a position measuring system, equipped according to the present invention, with an embodiment of a mounting aid in accordance with the present invention.
Figure 2:
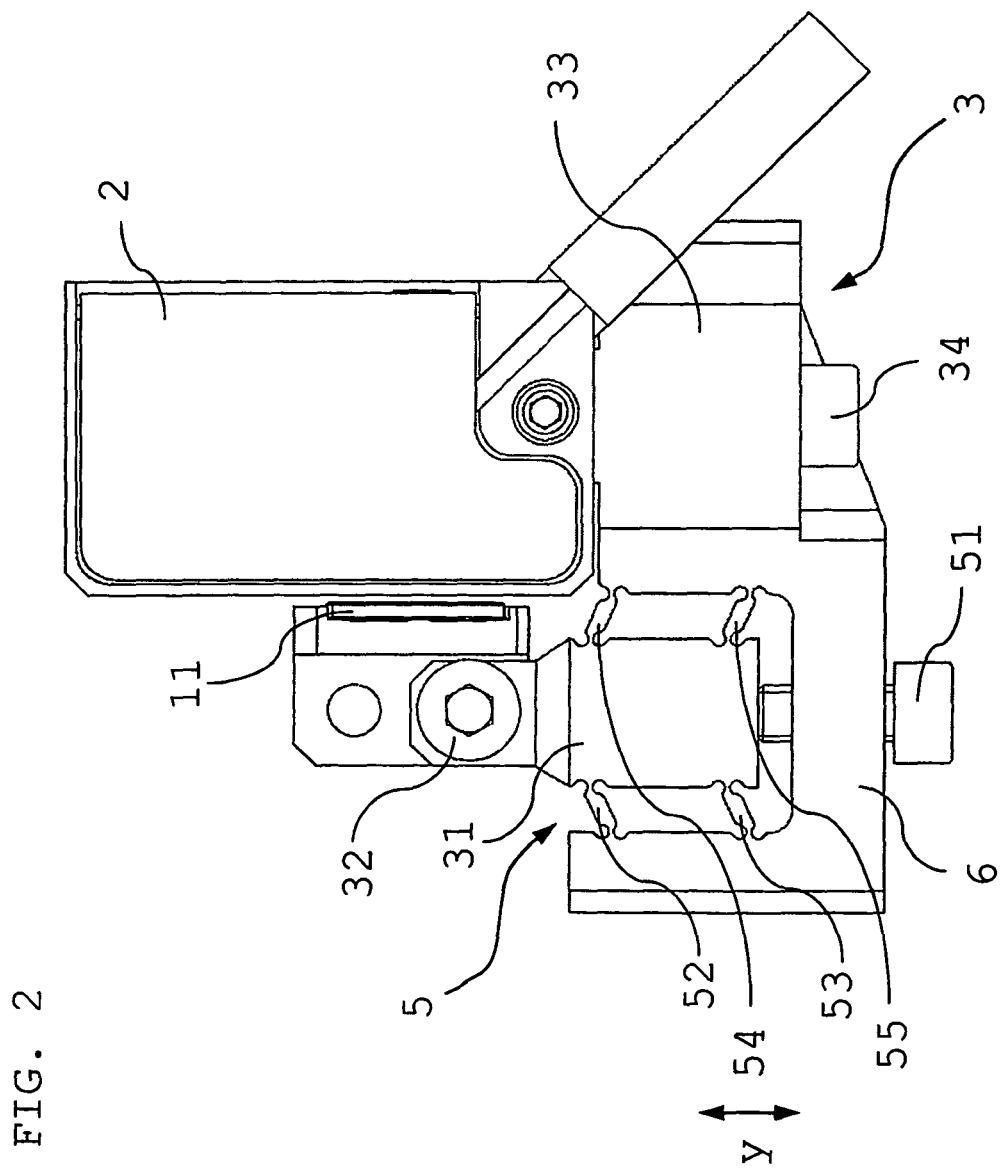
FIG. 2 shows a view A of the position measuring system of FIG. 1.
Figure 3:
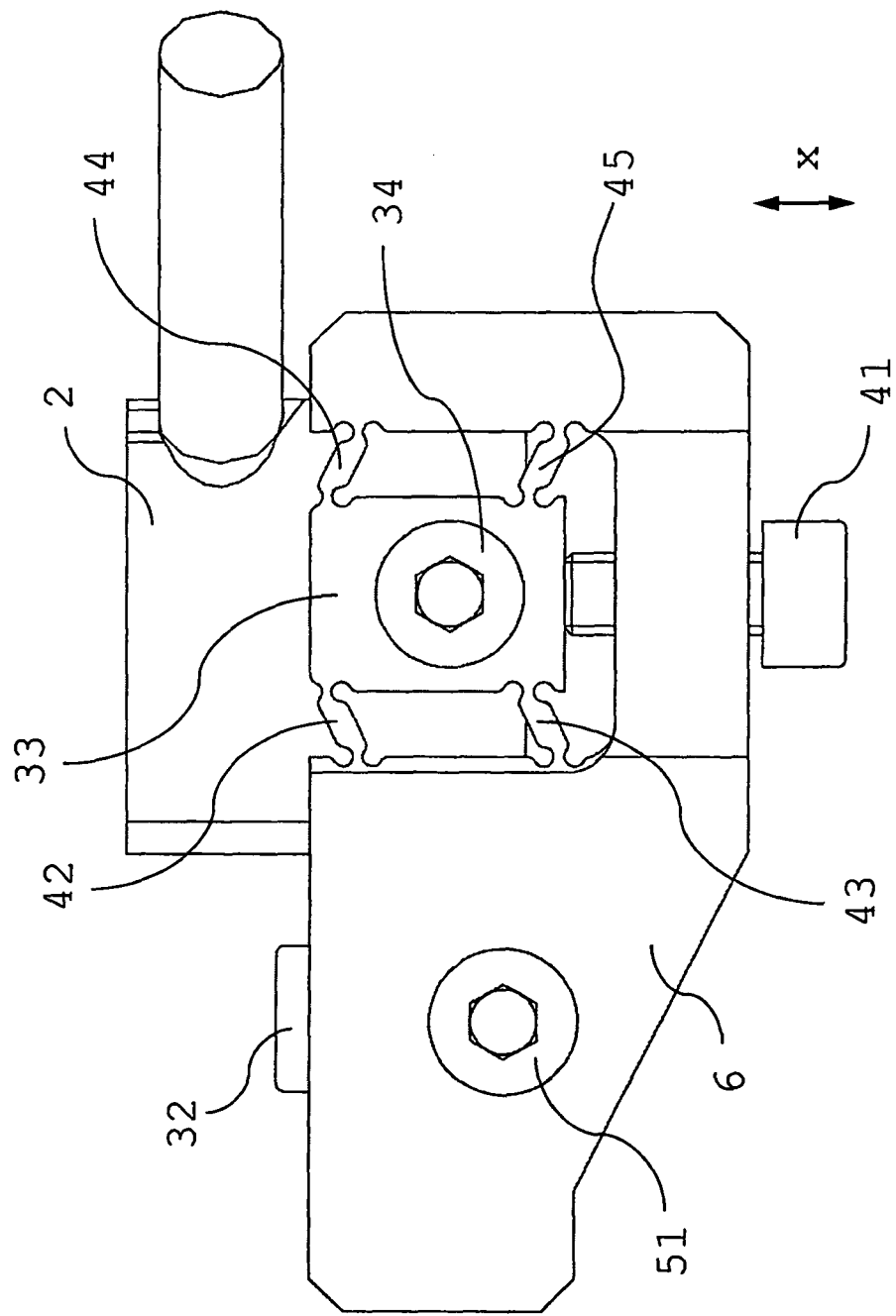
FIG. 3 shows a view B of the position measuring system of FIG. 1.

Next, in conjunction with FIGS. 1 through 3, an advantageous embodiment of the calibration devices 4 and 5 will be described in detail. Each of the calibration devices 4 and 5 includes a linear guide and an adjusting element 41 and 51, respectively, for initiating the adjustment. In the example shown, as the adjusting element 41, 51, a respective screw is used, preferably with a fine thread.

The calibration device 4 is disposed between the base body 6 and the second portion 33 of the mounting aid 3. The linear guide is formed by an arrangement of connecting rods 42-45 that couples the second portion 33 to the base body 6 solely in the linear degree of freedom X but in all the other degrees of freedom blocks any relative motion between the base body 6 and the second portion 33.

The arrangement of deflectable connecting rods 42-45 forms a parallel guide. For that purpose, the connecting rods 42-45 are disposed mirror-symmetrically to the deflection direction X, and at least two of the connecting rods 42-45 are provided on each side. As a result, the forces occurring upon an adjusting motion in the X direction occur symmetrically to the axis of motion X.

The connecting rods 42-45 are preferably embodied in one piece with the base body 6 and the second portion 33. The connecting rods 42-45 each have a solid-state joint at the connection point to the base body 6 on the one hand and at the connection point to the second portion 33 on the other.

The calibration device 5 is disposed between the base body 6 and the first portion 31 of the mounting aid 3. The linear guide is formed by an arrangement of connecting rods 52-55 that couples the first portion 31 to the base body 6 solely in the linear degree of freedom Y but in all the other degrees of freedom blocks any relative motion between the base body 6 and the first portion 31.

The arrangement of deflectable connecting rods 52-55 forms a parallel guide. For that purpose, the connecting rods 52-55 are disposed mirror-symmetrically to the deflection direction Y, and at least two of the connecting rods 52-55 are provided on each side. As a result, the forces occurring upon an adjusting motion in the Y direction occur symmetrically to the axis of motion Y.

The connecting rods 52-55 are preferably embodied in one piece with the base body 6 and the first portion 31. The connecting rods 52-55 each have a solid-state joint at the connection point to the base body 6 on the one hand and at the connection point to the first portion 31 on the other.

Preferably, the connecting rods 42-45 are prestressed in the direction of motion X in such a way that the adjusting element 41 and the second portion 33 are forced against one another over the entire requisite adjustment path in both directions, both +X and −X.

This prestressing is also provided in the Y direction between the adjusting element 51 and the first portion 31.

The calibration devices 4, 5 are embodied such that they enable a requisite adjusting motion on the order of magnitude of a fraction of one millimeter.

Figure 6:
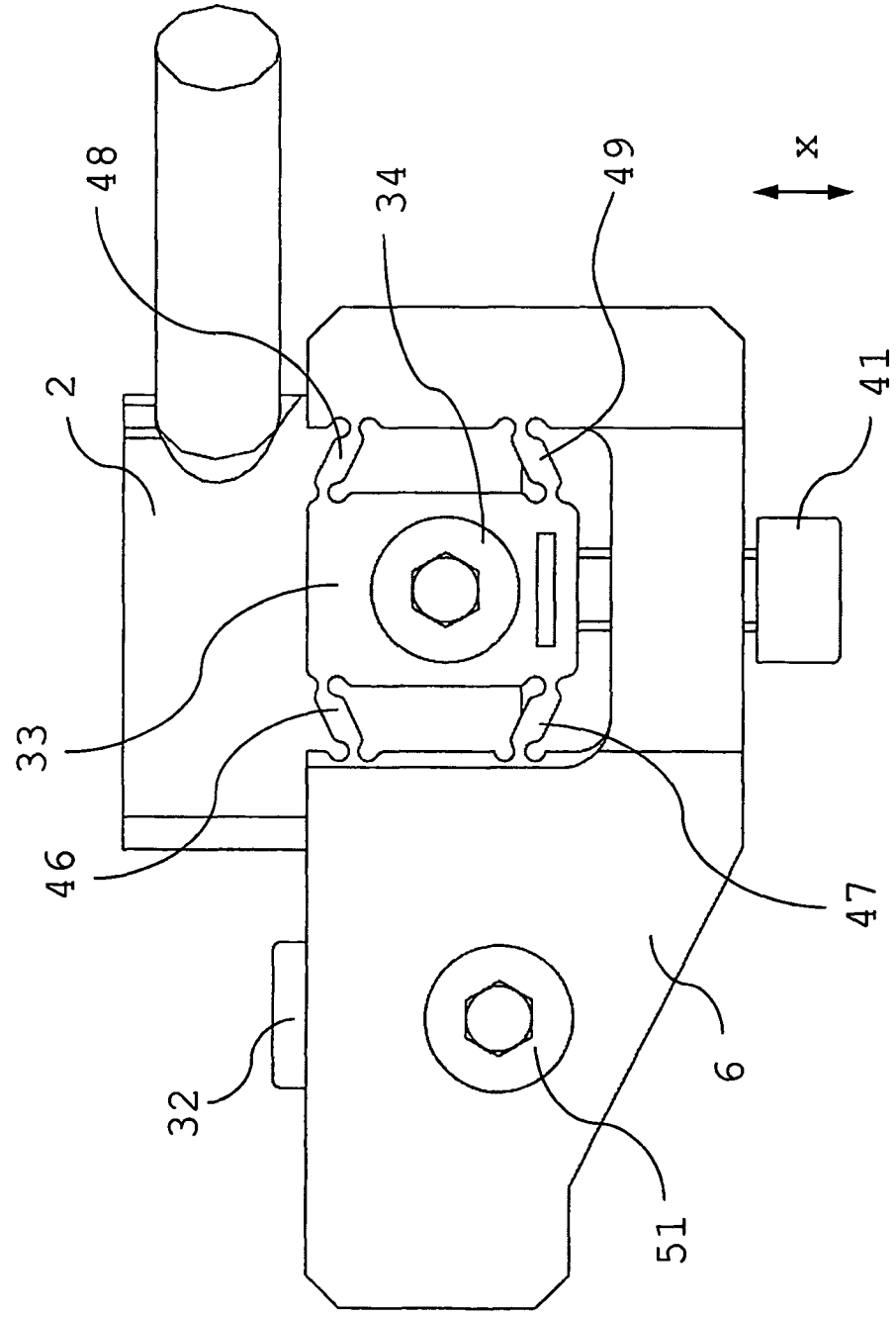
FIG. 6 shows a view of the position measuring system of FIG. 1 with a second embodiment of a mounting aid in accordance with the present invention.

In FIG. 6, a further possibility of the disposition of connecting rods 46-49 is shown in conjunction with the calibration device 4. The respective connecting rods 46-49 disposed on one side of the motion direction X here are not disposed parallel to one another but rather at an angle to one another.

The present invention is applicable not only to position measuring systems for measuring angles; instead, the invention can be used in linear measurement systems as well.

The foregoing description is provided to illustrate the invention, and is not to be construed as a limitation. Numerous additions, substitutions and other changes can be made to the invention without departing from its scope as set forth in the appended claims.

We claim:

1. A position measuring system for measuring a relative position of a first machine part relative to a second machine part in a measurement direction, the position measurement system comprising:
    a substrate of a measurement graduation, wherein said substrate is mountable on a first machine part;
    a scanning head for scanning said measurement graduation, wherein said scanning head is mountable on a second machine part that moves relative to said first machine part in a measurement direction; and
    a mounting aid that secures said substrate in a mounting position on said scanning head so that said substrate and said scanning head can be manipulated as a common unit and are mountable in this relationship on said first machine part and said second machine part, wherein said mounting aid comprises:
    a first portion for fixing on itself said substrate in said mounting position in a stationary fashion and after mounting has been accomplished a fixation between said first portion and said substrate is detachable;
    a second portion for fixing on itself said scanning head in said mounting position in a stationary fashion, and, after said mounting has been accomplished, a fixation between said second portion and said scanning head is detachable; and
    a calibration device positioned between said first portion and said second portion, wherein said calibration device has a structure such that a mounting position of said mounting aid between said substrate and said scanning head is adjustable in a first degree of freedom, which differs from said measurement direction and wherein said calibration device has a structure such that a linear adjusting motion is made possible; and, wherein said calibration device comprises an arrangement of a plurality of deflectable connecting rods and an adjusting element.

2. The position measuring system as defined by claim 1, wherein said plurality of deflectable connecting rods comprise four connecting rods that are disposed mirror-symmetrically to a direction of said linear adjusting motion.

3. The position measuring system as defined by claim 1, further comprising a second calibration device provided between said first portion and said second portion so that said mounting aid between said substrate and said scanning head is adjustable in a second degree of freedom that differs from said measurement direction and is independent of said first degree of freedom.

4. The position measuring system as defined by claim 3, wherein said calibration device is disposed between said first portion and a base body of said mounting aid, wherein said calibration device has a structure such that said mounting position of said mounting aid between said substrate and said scanning head is adjustable in said first degree of freedom and wherein said second calibration device is disposed between said base body and said second portion of said mounting aid, wherein said second calibration device has a structure such that said mounting position of said mounting aid between said substrate and said scanning head is adjustable in said second degree of freedom.

5. The position measuring system as defined by claim 4, wherein with said calibration device, said first portion is connected adjustably to said base body in said first degree of freedom, wherein said first degree of freedom is linear; and wherein with said second calibration device, said second portion is connected adjustably to said base body in said second degree of freedom, wherein said second degree of freedom is linear.

6. The position measuring system as defined by claim 3, wherein said measurement graduation is a radial graduation for position measurement about a rotary axis in said measurement direction that is a rotational measurement direction; and wherein said calibration device has a structure that allows for a linear adjusting motion in a radial direction with respect to said rotary axis is made possible; and wherein said second calibration device has a structure that allows for a linear adjusting motion at a tangent to said rotational measurement direction.

* * * * *